US012627462B2

(12) United States Patent (10) Patent No.: US 12,627,462 B2
Veneroso et al. (45) Date of Patent: May 12, 2026

(54) SECURE PROVISION OF KEYS FOR FULLY HOMOMORPHIC ENCRYPTION

(71) Applicant: STMicroelectronics S.r.l., Agrate Brianza (IT)

(72) Inventors: Amedeo Veneroso, Caserta (IT); Vincenzo Pascariello, San Nicola la Strada (IT); Alfonso Tramontano, Caserta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 282 days.

(21) Appl. No.: 18/314,534

(22) Filed: May 9, 2023

(65) Prior Publication Data

US 2023/0379136 A1 Nov. 23, 2023

(30) Foreign Application Priority Data

May 17, 2022 (FR) ...................................... 2204682

(51) Int. Cl.
*H04L 9/00* (2022.01)
*G06F 9/4401* (2018.01)
(52) U.S. Cl.
CPC ............ *H04L 9/008* (2013.01); *G06F 9/4401* (2013.01)
(58) Field of Classification Search
CPC ................................ H04L 9/008; G06F 9/4401
See application file for complete search history.

(56) References Cited

U.S. PATENT DOCUMENTS

2020/0327250 A1* 10/2020 Wang ..................... G06N 20/00
2020/0358611 A1* 11/2020 Hoang ................... G06N 3/045

OTHER PUBLICATIONS

Bourse, Florian et al., "Fast Homomorphic Evaluation of Deep Discretized Neural Networks", Jul. 24, 2018, 16th European Conference—Computer Vision—ECCV 2020, Cornell University Library, 201 Olin Library Cornell University Thaca, NY 14853, pp. 483-512.
Chillotti et al. "Improved Programmable Bootstrapping with Larger Precision and Efficient Arithmetic Circuits for TFHE", Nov. 2021, 63 pages.
Chillotti, Ilaria et al., "Programmable Bootstrapping Enables Efficient Homomorphic Inference of Deep Neural Networks", IACR, International Association For Cryptologic Research, vol. 20210127:133406, Jan. 25, 2021, 18 pages.

* cited by examiner

*Primary Examiner* — Vu V Tran
(74) *Attorney, Agent, or Firm* — Slater Matsil, LLP

(57) ABSTRACT

The present disclosure relates to a method including: the generation, by a computing device, of a first key and a bootstrapping key; the provision of the first key and an identifier of the bootstrapping key to an electronic device and the provision of the bootstrapping key and the identifier to a server; the fully homomorphic encryption, by the electronic device, of a first data value, stored in the electronic device, by using the first key; and the provision, by the electronic device, of the encrypted first data value and of the identifier, to the server.

20 Claims, 10 Drawing Sheets

SECURE PROVISION OF KEYS FOR FULLY HOMOMORPHIC ENCRYPTION

CROSS-REFERENCE TO RELATED APPLICATIONS

This application claims priority to French Application No. 2204682 filed on May 17, 2022, which application is hereby incorporated by reference herein in its entirety.

TECHNICAL FIELD

The present disclosure relates generally to the field of encryption, and in particular to the field of fully homomorphic data encryption.

BACKGROUND

Fully homomorphic encryption is an encryption form that permits operations to be validly performed on the encrypted data without first decrypting the data. This permits the operations to be performed in a non-secure environment, such as using a server belonging to a third party, without the confidentiality of the data being compromised. The data is stored by an electronic device and encrypted by the electronic device before being furnished to the server. The data resulting from the computations by the server on the encrypted data is returned to the electronic device still in a data-encrypted form. Once decrypted, the resulting data is the same as if it had been obtained by applying the computing operations directly to the unencrypted data.

Fully homomorphic encryption can be used for privacy-preserving out-sourced storage and computation. This allows data to be encrypted and outsourced to other environments for processing while remaining encrypted. Fully homomorphic encryption algorithms present the advantage of returning the result with relatively low noise, which is not the case for other homomorphic encryption algorithms. Using a bootstrapping key in the execution of the operations on the encrypted data obtains this advantage. However, there are technical problems in implementing fully homomorphic encryption algorithms.

SUMMARY

There is a need in the art for a method and device to implement fully homomorphic algorithms that overcome one or more problems in the prior art.

One embodiment provides a method including the generation, by a computing device, of a first key and a bootstrapping key; the provision of the first key and an identifier of the bootstrapping key to an electronic device and the provision of the bootstrapping key and the identifier to a server; the fully homomorphic encryption, by the electronic device, of a first data value, stored in the electronic device, by using the first key; and the provision, by the electronic device, of the encrypted first data value and of the identifier, to the server.

According to an embodiment, the method above further includes performing, by the server, the first operation on the second data value according to a fully homomorphic processing algorithm based on the encrypted first data value and the bootstrapping key.

According to an embodiment, the method above further includes the reception, by the electronic device, of a second data value from the server; and the generation of a third data value by fully homomorphic decryption of the second data value using the first key, the third data value corresponding to the result of a first operation applied to the first data value.

According to an embodiment, the electronic device includes a secure circuit, the method further including, after the provision of the first key, the storage of the first key in the secure circuit.

According to an embodiment, the electronic device includes a cryptographic processor where the fully homomorphic encryption of the first data value includes the generation, by the cryptographic processor, of an intermediary first data value by encoding the first data value; and the application of a fully homomorphic encryption algorithm to the intermediary first data value, by the cryptographic processor and using the first key, the encryption resulting in the encrypted first data value.

According to an embodiment, the fully homomorphic decryption of the second value includes the application of a fully homomorphic decryption algorithm to the second data value by the cryptographic processor and using the first key, the decryption resulting in an intermediary third data value; and the decoding of the intermediary third data value, by the cryptographic processor, resulting in the third data value.

According to an embodiment, the fully homomorphic processing of the encrypted first data value is performed by a neural network implemented in the server.

According to an embodiment, one or more neurons of the neural network are configured to perform a bootstrapping operation using the bootstrapping key.

According to an embodiment, the first key is a sequence of N words of bits, each of the N words including a number of M bits, and wherein the encryption algorithm includes a) the generation of $J+1$ random numbers, where $J+1$ is equal to $N*M$; b) the calculation of the sum of the product of bits of the secret key with corresponding ones of the random numbers; and c) the addition of the data value to be encrypted to the sum.

According to an embodiment, the order of the additions in step b) is selected randomly by the cryptographic processor.

According to an embodiment, the first key is stored in a memory of the electronic device masked with a random mask, the demasking being performed during the execution of the encryption algorithm.

According to an embodiment, step b) further includes calculating a further sum of the random numbers for which the corresponding bit of the secret key is 0.

One embodiment provides a system including a computing device configured to generate a first key, and a bootstrapping key, to provide the first key and an identifier of the bootstrapping key to an electronic device and to provide the bootstrapping key and the identifier to a server; and the electronic device configured to encrypt according to a fully homomorphic encryption algorithm a first data value, using the first key; and provide the encrypted first data value and the identifier to the server.

According to an embodiment, the system above further includes the server configured to compute, according to fully homomorphic processing based on the encrypted first data value and the bootstrapping key, a second data value; and provide the second data value to the electronic device, the electronic device is further configured to generate a third data value by applying, to the second data value, a fully homomorphic decryption algorithm that uses the first key, the third data value corresponding to the result of a first operation applied to the first data value.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural or functional features that are common among the various embodiments may have the same references and may dispose identical structural, dimensional and material properties.

For the sake of clarity, only the operations and elements that are useful for an understanding of the embodiments described herein have been illustrated and described in detail. Unless indicated otherwise, when reference is made to two elements connected together, this signifies a direct connection without any intermediate elements other than conductors, and when reference is made to two elements coupled together, this signifies that these two elements can be connected or they can be coupled via one or more other elements. In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures. Unless specified otherwise, the expressions "around," "approximately," "substantially," and "in the order of" signify within 10%, and preferably within 5%.

Figure 1:
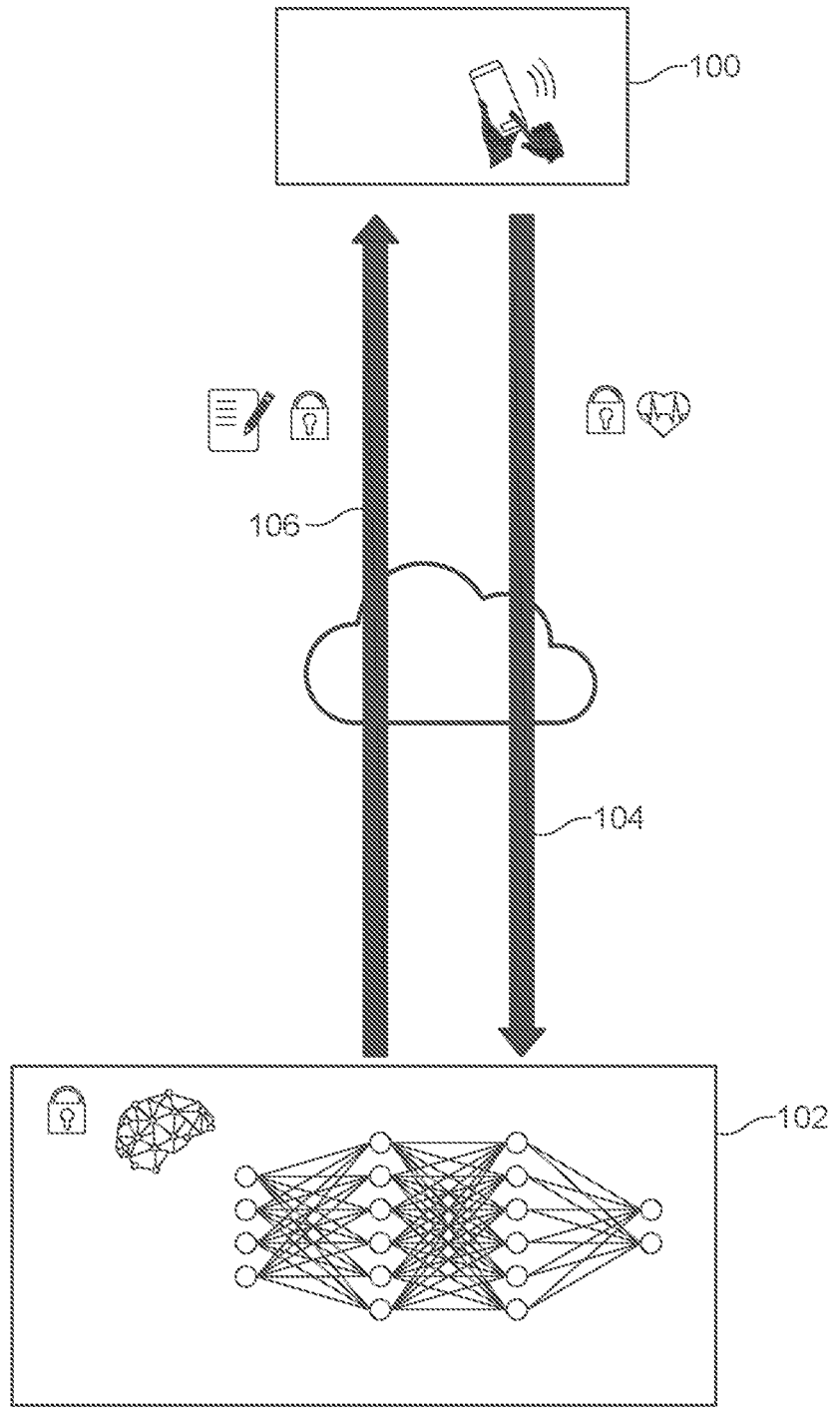
FIG. 1 schematically illustrates an example of a system implementing a fully homomorphic cryptography algorithm.

FIG. 1 schematically illustrates an example of a system implementing a fully homomorphic cryptography algorithm. For example, an electronic device 100 contains data, such as medical data, which is to be processed by an external server 102 to establish a diagnosis. For example, the electronic device 100 does not have sufficient memory or processing resources to be able to perform the processing of the data. In the example of FIG. 1, server 102 includes a neural network configured to process the data.

In embodiments, the processing, by server 102, is to be done without compromising the confidentiality of the data. For that, the data is sent to server 102 in an encrypted form in communication 104. In particular, this encrypted form results from the fact that data processed by server 102 is not decrypted before the processing by server 102, and thus the result of the processing is also in an encrypted form, without any new encryption operation being necessary. For example, the neural network implemented by server 102 is configured to perform operations on the encrypted data and to furnish an encrypted result, which is returned to the electronic device 100 in communication 106.

The electronic device 100 is then configured to decrypt the received encrypted result. This decryption results in an unencrypted result, corresponding to the one which would have been obtained if the original unencrypted data had been furnished to server 102.

According to an embodiment, the encryption of the data, by the electronic device 100, and its processing, by the server 102, resulting in encrypted output data, and the decryption of the encrypted output data, by the electronic device 100, is performed according to fully homomorphic cryptography.

The encryption and decryption algorithms applied by the electronic device 100 are, for example, based on the utilization of a secret key K. For example, the secret key K is a symmetric key, and the encryption of the data, by the electronic device 100, and the decryption of the encrypted output data, also by the electronic device 100, is based on symmetric cryptography, using the secret key K.

To reduce noise that can be present in the output of the operations, which generally include additions or multiplications, one or more bootstrapping operations are typically performed during the processing of the encrypted data. Thus, server 102 is configured to, for example, perform one or more bootstrapping operations using a bootstrapping key $b_k$. For example, the bootstrapping operation is applied by at least one of the neurons of the neural network, and in some cases by some or all of the neurons of the neural network. The technique of bootstrapping is known to those skilled in the art, and is, for example, described in more detail in the publication "Improved Programmable Bootstrapping with Larger Precision and Efficient Arithmetic Circuits for TFHE" published in Advances in Cryptology—ASIA-CRYPT 2021, the contents of this publication being incorporated herein by reference in its entirety.

The bootstrapping key $b_k$ is for example generated based on the secret key K. The size of such a bootstrapping key is generally large, for example between 10 and 20 megabytes, which, in some cases, may be larger than the storage capacity of the electronic device 100. Additionally, or alternatively, the computation of such a bootstrapping key involves relatively high computing power, which, in some cases, is beyond the capabilities of the electronic device 100.

As the secret key K should not be communicated to server 102, the generation of the bootstrapping key $b_k$ should not be performed by server 102.

While FIG. 1 illustrates an example in which the data is medical data and in which the processing of the encrypted medical data is performed by a neural network, in alternative embodiments, the data could be another type of confidential or sensitive data, and the processing of this data by the server 102 could involve other means in addition to, or instead of, the neural network.

Figure 2:
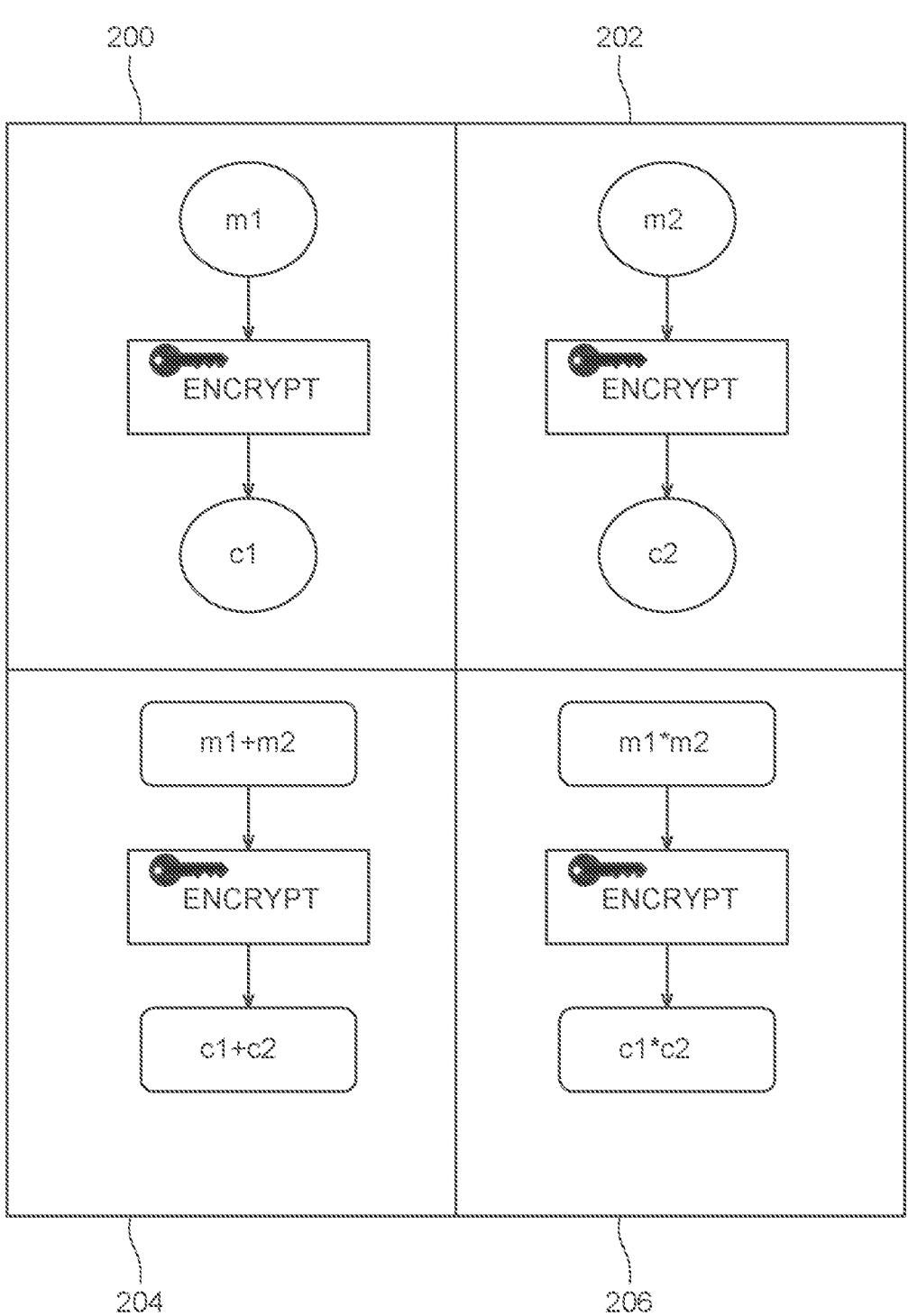
FIG. 2 represents examples of fully homomorphic encryption operations and illustrates the properties of fully homomorphic cryptography.

FIG. 2 represents examples of fully homomorphic encryption operations and illustrates the properties of fully homomorphic cryptography. As represented by blocks 200 and 202, a fully homomorphic encryption algorithm (ENCRYPT) using the secret key K and applied to plaintext data $m_1$ and $m_2$ results in encrypted data $c_1$ and $c_2$, respectively. We write: Encrypt($m_1$, K)=$c_1$, and Encrypt($m_2$, K)=$c_2$, where Encrypt is the encryption function resulting from the application of the fully homomorphic encryption algorithm.

Moreover, the decryption of the encrypted data $c_1$ results in the plaintext data $m_1$. We write Decrypt($c_1$, K)=$m_1$, where Decrypt is the decryption function that reverses the encryption function Encrypt. Similarly, the decryption of the encrypted data $c_2$ results in the plaintext data $m_2$. We write Decrypt($c_2$K)=$m_2$.

The principle of fully homomorphic cryptography algorithms is to be additively and multiplicatively homomorphic, as represented by blocks 204 and 206 of FIG. 2. Block 204 illustrates the additive homomorphism property, where the encryption of the addition of the plaintext data $m_1$ and $m_2$ is equal to the addition of the encrypted data $c_1$ and $c_2$, that is to say: Encrypt($m_1$+$m_2$, K)=$c_1$+$c_2$.

Similarly, block 206 illustrates the multiplicative homomorphism property. The encryption of the product of the plaintext data $m_1$ and $m_2$ is equal to the product of the encrypted data $c_1$ and $c_2$, that is to say: Encrypt($m_1$*$m_2$, K)=$c_1$*$c_2$.

In practice, server 102 is configured to receive a number N of encrypted data $c_1, \ldots, c_N$, where, for each i belonging to the set $\{1, \ldots, N\}$, $c_i$=Encrypt($m_i$, K) corresponds to the encryption, by the electronic device 100, of a plaintext data $m_i$. Server 102 is further configured to apply an operation Eval, corresponding to a combination of additions and multiplications, to the encrypted data $c_1$ to $c_N$. In other words, server 102 is configured to generate encrypted data c=Eval($c_1, \ldots, c_N$). Fully homomorphic cryptography algorithms are such that the decryption, by the electronic device 100, of the encrypted data c is equal to a plaintext data m that is the same as the data that would have been obtained by application of the operation Eval to the plaintext data $m_1$ to $m_N$. In other words: [Math 1] m=Decrypt (Eval($c_1, \ldots, c_N$), K)=Eval($m_1, \ldots, m_N$).

However, the properties of homomorphic stability by application of a plurality of additions and multiplications are only verified by fully homomorphic cryptography algorithms. Indeed, the accumulation of additions and more particularly of multiplications in only partially homomorphic algorithms brings noise to intermediate values manipulated by the server 102. This results in the decrypted data m not corresponding exactly to the value of Eval($m_1, \ldots, m_N$).

Figure 3A:
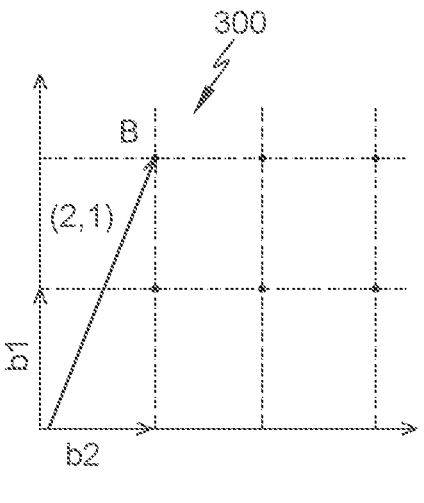
FIG. 3A illustrates a lattice used in fully homomorphic cryptography.

FIG. 3A illustrates a lattice 300 used in fully homomorphic cryptographic algorithms. The lattice 300 is fully described by a basis composed of two vectors $b_1$ and $b_2$. The lattice 300 includes any vectors which could be written as $a_1 b_1 + a_2 b_2$, where $a_1$ and $a_2$ belong to the set of integers $\mathbb{N}$.

In the example illustrated by lattice 300, $b_1$=(0,1) and $b_2$=(1,0), and the lattice is an Euclidean lattice equivalent to the set $\mathbb{N}^2$. A vector B of the lattice 300 is for example equal the vector $2b_1 + b_2$, and the vector B is then designated by the coordinates (2,1).

In practice, the lattices used in fully homomorphic cryptography are described by a basis including thousands of dimensions, for example between 6000 and 7000 dimensions. Moreover, in practice, the vectors $b_1$ and $b_2$ are not necessarily orthogonal.

Figure 3B:
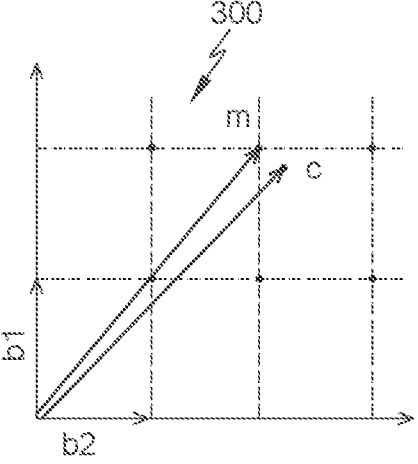
FIG. 3B illustrates a lattice and represents a resolution of a closest vector problem.

FIG. 3B illustrates a lattice and represents a resolution of a closest vector problem. In fully homomorphic and partially homomorphic cryptography, lattices are used to create NP ("nondeterministic polynomial time") problems, as the closest vector problem. For example, a pre-condition to make the lattice problem an NP problem is to consider a lattice basis including non-orthogonal vectors.

For example, encrypted data is represented by a vector c. The vector c does not belong to the lattice 300, that is to say, the vector c cannot be written as a linear combination of $b_1$ and $b_2$ with integer coefficients.

The decryption of the vector c for example consists in solving the closest vector problem, that is to say, finding the vector of the lattice 300 for which a distance, for example, the Euclidean norm, with respect to the vector c is minimal. In the example illustrated in FIG. 3B, this closest vector is a vector $m=2b_1 + 2b_2$.

The closest vector problem is one example of an approach that can be applied to perform lattice-based cryptography. Additionally, or alternatively, other problems, such as the closest point problem, or the shortest vector problem, can be used to encrypt or decrypt data.

Figure 3C:
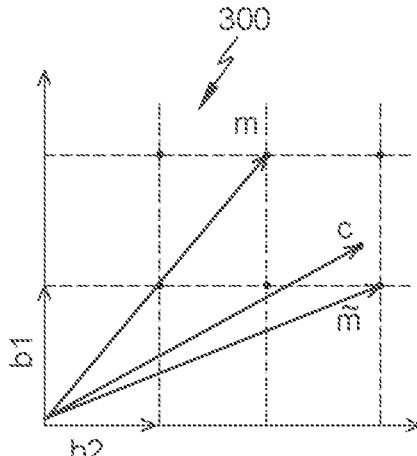
FIG. 3C illustrates a lattice and represents noise error induced by the processing of encrypted data by partially homomorphic cryptography algorithms.

FIG. 3C illustrates the noise error that the processing of encrypted data by partially homomorphic cryptography algorithms induces. For example, vector c is encrypted data computed by server 102 by performing several additions or multiplications to input data furnished by the electronic device 100. In the example illustrated by FIG. 3C, the expected unencrypted result is the vector value m. Nevertheless, the algorithm used in this example is only partially homomorphic. Therefore, the encrypted result c may include noise or errors. The noise is for example due to the mathematical problems on which the encryption or decryption scheme relies, for example, the closest vector problem. As the operations applied to the data progress, the noise increases, the increases being particularly high when the operations are multiplications.

In the example of FIG. 3C, a vector $\tilde{m}$ solves the closest vector problem for the encrypted value c. The decryption by the electronic device 100 of the encrypted result c thus leads to a wrong decrypted data, in other words, in this case, with the notations introduced in relation with the FIG. 2, [Math 2] Decrypt($\tilde{m}$, K)≠Eval($m_1, \ldots m_N$).

To avoid the accumulation of errors, fully homomorphic algorithms involve using a bootstrapping step, performed by server 102, during the processing, to eliminate the errors in the operations performed. This step is based on using a bootstrapping key $b_k$. The bootstrapping key $b_k$ is for example generated from the secret key K.

In an example, the secret key K is an LWE (Learning With Errors) secret key and the bootstrapping key $b_k$ is a public key computed from the LWE secret key K and from a GLWE (General Learning With Errors) secret key S. The GLWE secret key S is for example generated by the device 100, to generate the bootstrapping key $b_k$. The bootstrapping key $b_k$ then, for example, consists in a list of a number J of GGSW (for General Gentry, Sahai, and Walter) ciphertexts, the number J, for example, being equal to 630. Each GGSW ciphertext encrypts, using the GLWE secret key S, a bit of the LWE secret key K.

The generation of a bootstrapping key is known for the person skilled in the art and is for example described in more detail in the publication "Programmable Bootstrapping Enables Efficient Homomorphic Inference of Deep Neural Networks" by Ilaria Chillotti and Marc Joyce published in Cyber Security Cryptography and Machine Learning, 2021, which is incorporated herein by reference in its entirety.

The bootstrapping step is for example performed, by server 102, after each addition or multiplication, or after a given number of additions or multiplications. More particularly, the bootstrapping step is for example performed by the neural network, by each neuron, or at different stages of the processing.

The bootstrapping step for example consists of an application of a decrypting function using the bootstrapping key $b_k$. This decryption is for example applied on a GLWE encryption $Encrypt_R$, under the GLWE secret key S, of the LWE ciphertext $(Eval(Encrypt(m_1, K), \ldots, Encrypt(m_N, K))$. Then, the decryption using the bootstrapping key $b_k$ is such that [Math 3]: $Decrypt_H(Encrypt_R(Eval(Encrypt(m_1, K), \ldots, Encrypt(m_N, K)), S), b_k) = Encrypt_R(Eval(m_1, \ldots m_N), S)$.

However, in practice, this decryption is achieved by server 102 thanks to operations knowns as "Blind Rotation" and "Sample Extraction" also described in the publication mentioned above. For this reason, device 100 for example also sends to server 102 the GLWE encryption, using the secret key S, of a properly built polynomial V(X). For example, the polynomial V(X) is a polynomial with the following coefficients $(0, \ldots, 0, 1, \ldots, 1, \ldots, r-1, \ldots, r-1, 0, \ldots, 0)$, where each value different from 0 is repeated $2^n$ times, while the 0 are repeated $2^{n-1}$ times and where $\{0, 1, \ldots, r\}$ is the set of all possible messages, while n is the maximum number of least significant bits admitted to storing the noise inside a plaintext. In other words, it is possible to retrieve the original plaintext as long as the noise is less than $2^n$.

Finally, the bootstrapping step includes a key switching operation to return to encryption under the initial key K, where $b_k = Encrypt(K, S)$.

Nevertheless, the generation of the bootstrapping key $b_k$, by the electronic device 100, may not be possible because it is expensive in terms of computing capacity and power and in terms of time. Moreover, the large size of a bootstrapping key does not always allow its storage on the electronic device 100 before being sent to server 102. Moreover, it makes no sense to furnish the secret key K to server 102 to let it generate the bootstrapping key $b_k$.

According to an embodiment that will now be described with reference to FIG. 4, the secret key K is for example generated by a computing device during manufacture of the electronic device 100. According to this embodiment, the computing device is further configured to generate the bootstrapping key $b_k$, for example from the secret key K and to furnish it directly to the server 102.

Figure 4:
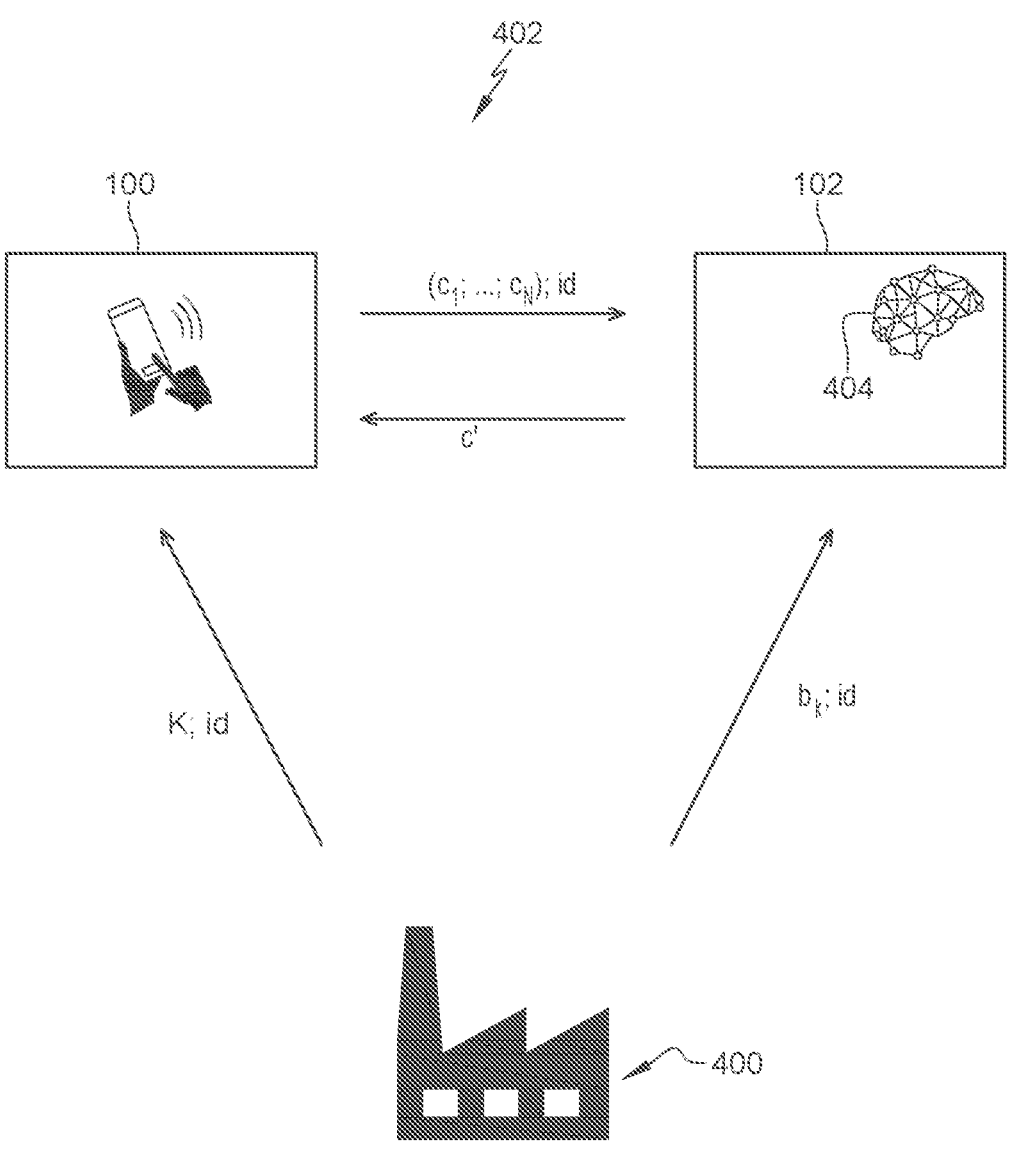
FIG. 4 schematically illustrates a system configured to implement a fully homomorphic cryptography algorithm according to an embodiment of the present disclosure.

FIG. 4 schematically illustrates a system 402 configured to implement a fully homomorphic cryptography algorithm according to an embodiment. System 402 includes the computing device, labeled 400 in FIG. 4, used for generating the bootstrapping key $b_k$, the electronic device 100, and the server 102.

According to an embodiment, the computing device 400 is configured to generate the secret key K and to provide it, in a secure way, to the electronic device 100. The computing device 400 is further configured to generate the bootstrapping key $b_k$ and to provide the bootstrapping key $b_k$ to server 102.

According to an embodiment, the computing device 400 is further configured to provide the secret key K to the electronic device 100 in association with an identifier id. This identifier id is also provided to server 102 in association with the bootstrapping key $b_k$. The server 102 for example stores the bootstrapping key $b_k$ in association with the identifier id.

According to an embodiment, the electronic device 100 is configured to encrypt plaintext data using the secret key K to generate encrypted data $c_1$ to $c_N$ and to provide this encrypted data, in association with the identifier id, to the server 102. The server 102 is for example configured to identify, based on the identifier id, the bootstrapping key $b_k$ associated with the secret key K and which can be used to process the encrypted data from the electronic device 100. For example, the server 102 also stores other identifiers in association with other bootstrapping keys, which are for example used for processing encrypted data from other devices, similar to the electronic device 100.

Server 102 for example includes a neural network 404 configured to apply fully homomorphic processing, using the bootstrapping key $b_k$, to the encrypted data $c_1$ to $c_N$. The server 102 is for example further configured to provide the bootstrapping key $b_k$ which is stored in association with the identifier id, to the neural network 404. The neural network 404 is then for example configured to execute operations, for example, by applying the function Eval, on the encrypted data $c_1$ to $c_N$ and to perform bootstrapping steps using the bootstrapping key $b_k$, for example by applying the decryption function $Decrypt_H$ to the result of the function Eval. The neural network 404 outputs an encrypted result c' and provide it to the electronic device 100. For example, the encrypted data c' is such that [Math 4]: $c' = Encrypt_R(Eval(m_1, \ldots, m_N)) = Decrypt_H(Encrypt_R(Eval(c_1, \ldots, c_N), S), b_k)$.

The electronic device 100 is then for example configured to apply the decryption algorithm, for example, the function Decrypt, to the encrypted output data c' to generate a plaintext result m'. In other words, the plaintext result in m' is equal to Decrypt(c', K).

Figure 5:
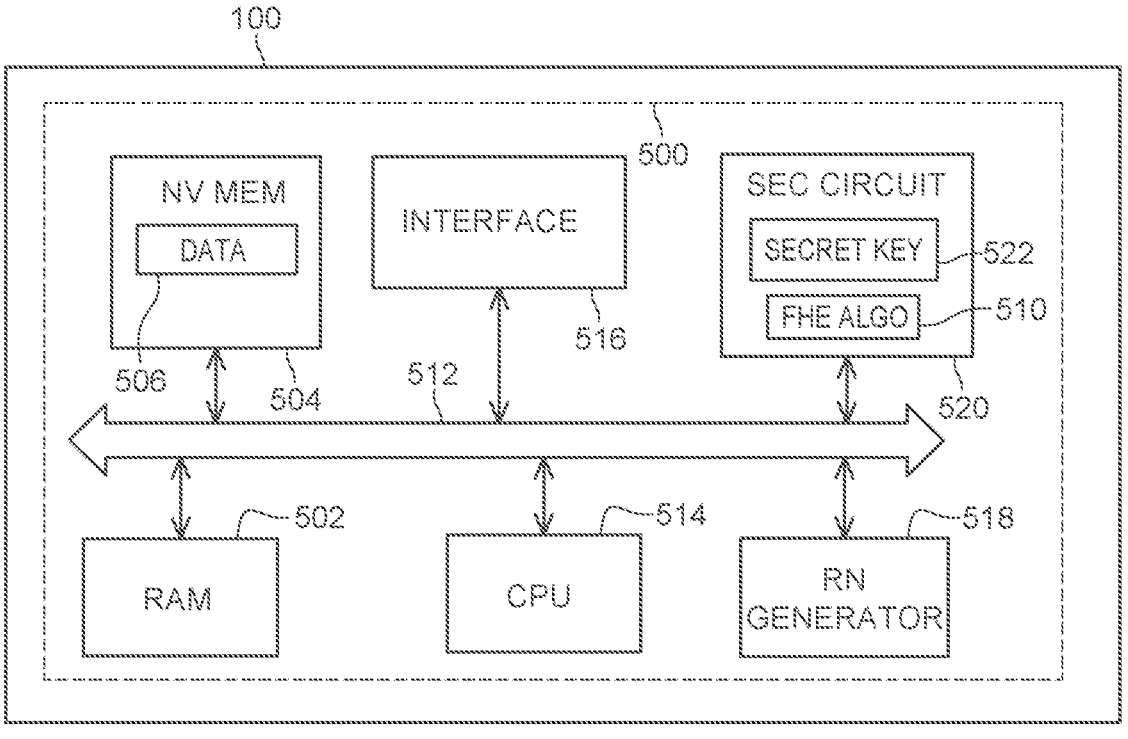
FIG. 5 schematically illustrates an electronic device configured to implement fully homomorphic encryption and decryption algorithms according to an example embodiment of the present disclosure.

FIG. 5 schematically illustrates the electronic device 100 including an integrated circuit 500 configured to implement a fully homomorphic encryption algorithm according to an embodiment of the present disclosure. The electronic device 100 is for example an IC (integrated circuit) card, smartphone, microprocessor circuit, etc.

The integrated circuit 500 of the electronic device 100 for example includes a volatile memory 502 (RAM), for example, a Random-Access Memory, and a non-volatile memory 504 (NV MEM), such as a Flash memory. The non-volatile memory 504 for example stores data 506 (DATA). The data 506 is for example sensitive or confidential data, such as personal data (medical data, banking data, e-voting data, etc.). For example, data 506 includes the plaintext data $m_1$ to $m_N$.

In embodiments, integrated circuit 500 further includes a non-secure processor 514 (CPU), an interface 516 (INTERFACE), and a random number generator 518 (RN GENERATOR) coupled to the volatile memory 502 and to the non-volatile memory 504 via a bus 512. In some embodiments, the random number generator 518 is a pseudorandom number generator (PRNG).

According to an embodiment, the integrated circuit 500 further includes a secure circuit 520 (SEC CIRCUIT), sometimes called a secure element, coupled to the bus 512. The secure circuit 520 is for example configured to store a secret key 522 (SECRET KEY) in a non-volatile fashion. The secret key 522 has for example previously been generated by the computing device 400 and is stored by the secure circuit 520 in association with the identifier id. The storage of the secret key 522 and the identifier id in the memory of the secure circuit 520 is for example performed during the manufacturing step of the electronic device 100 and in a secure environment. The secure circuit 520 if for example further configured to store instructions of fully homomorphic algorithms 510 (FHE ALGO). For example, the fully homomorphic algorithms include the encryption function Encrypt and the decryption function Decrypt.

According to an embodiment, when processor 514 initiates a processing of the data 506 by server 102, the data 506 is provided to a volatile memory of the secure circuit 520, and the secret key 522 is also for example loaded from a non-volatile memory of the secure circuit 520 to the volatile memory of the secure circuit. The secure circuit 520 then for example performs the encryption algorithm on the data. For example, the clear data $m_1$ to $m_N$ and the secret key K are stored in the volatile memory of the secure circuit 520, and then a processor of the secure circuit 520 is configured to apply the encryption function Encrypt to each clear data value $m_1$ to $m_N$ using the secret key K, to generate N encrypted data values $c_1$ to $c_N$, such that for all i belonging to the set $\{1, \ldots, N\}$, $c_i$=Encrypt($m_i$, K).

The interface 516 is for example configured to provide the encrypted data $c_1$ to $c_N$ to server 102. The provision of the encrypted data to server 102 is for example performed at least partially via wireless communications, and in some embodiments via one or more intermediate networks, such as the Internet.

Figure 6:
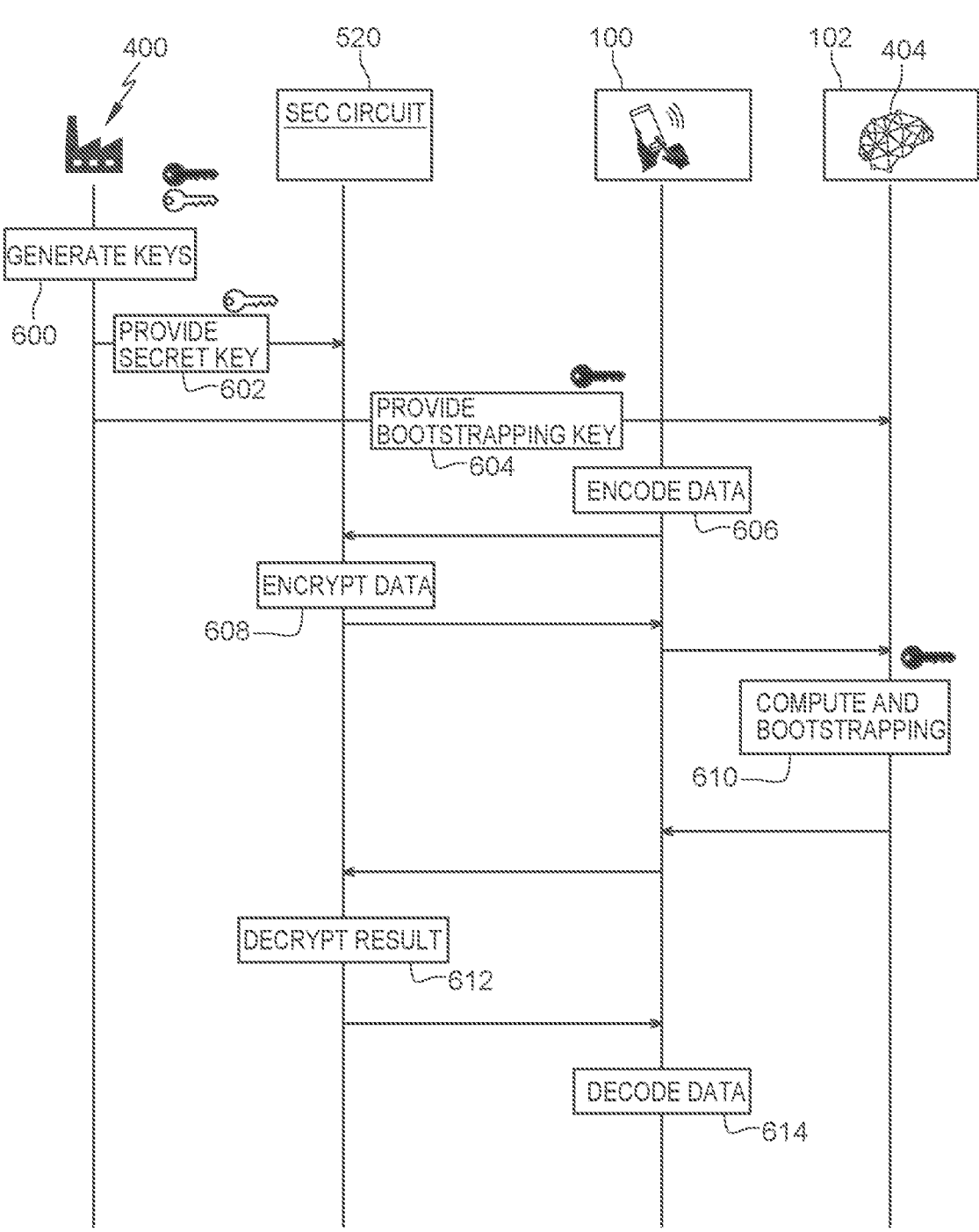
FIG. 6 is a flow diagram illustrating operations performed by the system to implement and execute a fully homomorphic cryptography algorithm according to an embodiment of the present disclosure.

FIG. 6 is a flow diagram illustrating operations performed by system 402 of FIG. 4 to implement and execute a fully homomorphic cryptography algorithm according to an embodiment. These operations are performed in particular by the computing device 400, by the secure circuit 520, by the electronic device 100, and in particular circuits of the electronic device 100 other than the secure circuit, and by the server 102.

The computing device 400 for example generates the secret key K and the bootstrapping key $b_k$ in step 600 (GENERATE KEYS). The generation for example takes place in a secure environment, for example during the manufacture of the electronic device 100.

The computing device 400 then for example provides the secret key K to the secure circuit 520 of the electronic device 100 in step 602 (PROVIDE SECRET KEY). The provision of the secret key K is for example performed in a secure environment and through secure communication. The computing device 400 further provides, in step 602 or in a separate step, the identifier id to the secure circuit 520 of the electronic device 100. The identifier id is for example stored in the non-volatile memory 504 of the electronic device 100. In another example, the identifier id is stored, in association with the secret key K, in a non-volatile memory element of the secure circuit 520. In some embodiments, the identifier id is a serial number, or other unique identifier, of the electronic device 100.

The computing device 400 further provides the bootstrapping key $b_k$, in association with the identifier id, to the server 102 or to the neural network 404 in step 604 (PROVIDE BOOTSTRAPPING KEY).

During the utilization of the electronic device 100, the electronic device 100 for example initiates a request for processing of data by the server 102. For example, the electronic device 100 includes one or more software applications configured to record the data and to determine when the data should be transmitted to server 102 for further data processing. For example, the data processing is too costly in terms of power requirements or in computing resources to be performed by the electronic device 100 itself.

Prior to being encrypted using the fully homomorphic algorithm, the plaintext data is first for example converted, in step 606 (ENCODE DATA), into a representation that allows its encryption.

For example, the encryption uses a Torus-based fully homomorphic encryption algorithm. The plaintext data is converted, in step 606, into values, each belonging to the real torus, where the real torus is equivalent to the set of real numbers modulo 1.

The encoded data is then encrypted in step 608 (ENCRYPT DATA) by the secure circuit 520 according to a fully homomorphic encryption algorithm, using the secret key K. For example, the encryption algorithm used in step 608 is a Torus-based fully homomorphic encryption algorithm and is included in the algorithms 510.

The encrypted data and the identifier id are then for example provided, for example by interface 516, to server 102.

In step 610 (COMPUTE AND BOOTSTRAPPING), server 102 retrieves the bootstrapping key $b_k$ thanks to the identifier id. In embodiments, the encrypted data and the bootstrapping key $b_k$ are applied as input data to the neural network 404. The neural network 404 is for example configured to perform one or more operations, for example, a combination of homomorphic additions or homomorphic multiplications, on the input data by a succession of layers of neurons of the neural network. The bootstrapping key $b_k$ is for example used on the output data values of each layer to eliminate the noise resulting from the application of homomorphic additions and multiplications to the encrypted data. In another example, the bootstrapping key $b_k$ is used by each neuron following the data processing operations applied by the neuron. The neural network 404 outputs an encrypted result, corresponding to the processing of the encrypted data. Server 102 then provides the encrypted result to electronic device 100.

The secret key K is for example loaded to the volatile memory of the secure circuit 520 with the encrypted result. The secure circuit 520 is for example configured to perform, in step 612 (DECRYPT RESULT), the decryption of the encrypted result. The decryption is performed using the fully homomorphic decryption algorithm Decrypt based on the secret key K. The decryption results in decrypted data.

The decrypted data is then decoded by the electronic device 102 in step 614 (DECODE DATA) according to a decoding algorithm, which is for example the inverse of the encoding scheme used in step 606. The data resulting from this decoding operation for example corresponds to the result of the processing of the original plaintext data. In particular, the decoded data for example corresponds to the data which would have been obtained if the processing had been performed directly on the clear data.

Moreover, as the electronic device 100 does not manipulate the bootstrapping key $b_k$, the duration of the data processing involving this bootstrapping key $b_k$ only depends on the computing capacity of the server 102.

Figure 7:
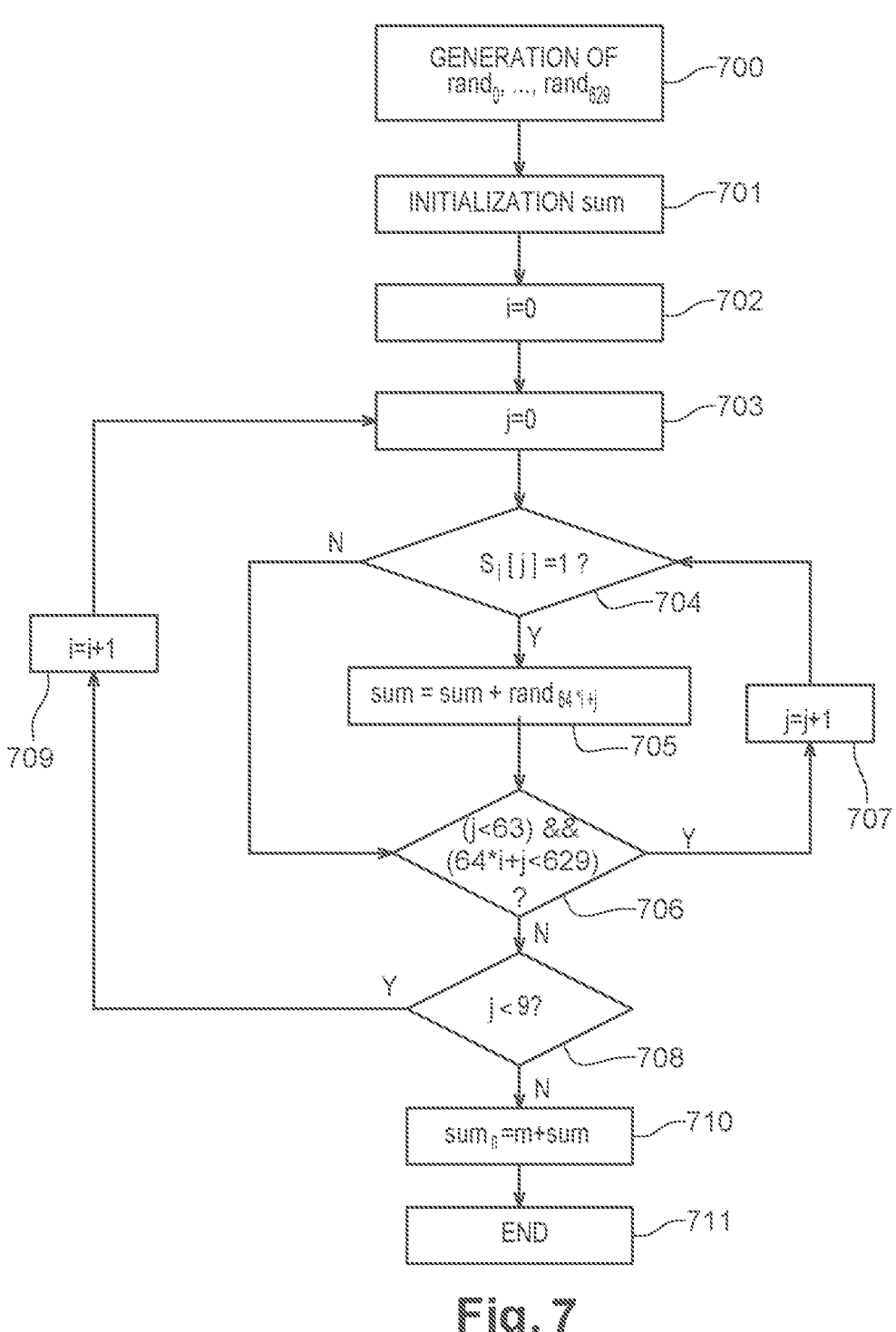
FIG. 7 is a flow diagram illustrating operations performed by the electronic device to encrypt or decrypt data according to an example embodiment of the present disclosure.

FIG. 7 is a flow diagram illustrating operations performed by the electronic device 100, such as the secure circuit 520 and random number generator 518 of the electronic device 100, to encrypt a plaintext data value $m_n$ or to decrypt an encrypted data according to an example embodiment. FIG. 7 is based on an example in which the plaintext data value $m_n$ is 8 bytes, although those skilled in the art will understand how the method could be adapted to plaintext data values of other lengths.

For example, the secret key K includes 10 words of 64 bits each. Other formats are of course possible. Indeed, the number of 10 words forming the secret key K and the number of 64 bits in each word are presented by way of example and are not limiting.

In step 700 (GENERATION OF $rand_0$, . . . , $rand_{629}$), a number of 630 random numbers $rand_0$ to $rand_{629}$ are generated, for example by the random number generator 518. The number of 630 random numbers is given as an example and is, of course, not limiting. Moreover, the plaintext data $m_N$ to be encrypted is for example 8 bytes.

In step 701 (INITIALIZATION sum), a variable sum is initialized, for example to the value 0.

In step 702, an iterative variable i is initialized, for example to the value 0.

In step 703, an iterative variable j is initialized, for example to the value 0.

In step 704 ($S_i[j]$=1?), it is determined, by the secure circuit 520, whether the $j^{th}$ bit of the $i^{th}$ word $S_i$ of the secret key K is equal to 1. If the $j^{th}$ bit of the $i^{th}$ word $S_i$ of the secret key K is equal to 1 (branch Y), the process continues in step 705 ($sum=sum+rand_{64*i+j}$). In step 705, the variable sum is incremented by the $(64*i+j)^{th}$ random number $rand_{64*i+j}$.

In the case where it is determined in step 704 that the $j^{th}$ bit of the $i^{th}$ word $S_i$ of the secret key K is not equal to 1 (branch N), or following the realization of step 705, the process continues in step 706 ((j<63) && (64*i+j<629)?).

In step 706, it is for example determined, by the secure circuit 520, whether the iterative variable j is less than 63 and the value 64i+j is less than 629. If so (branch Y), the iterative variable j is incremented to the value j+1 in step 707 (j=j+1) and the process resumes at step 704.

If, in step 706, it is determined that the iterative variable j is equal to 63 or that the value 64i+j is greater than 629 (branch N), it is then determined, in step 708 (i<9?) if the iterative variable i is less than to 9. If so (branch Y), the process continues in step 709 (i=i+1) in which the iterative variable i is incremented to the value i+1. Following step 709, the process resumes in step 703.

If, in step 708, it is determined that the iterative variable i is equal to 9 (branch N), then the plaintext data $m_n$ is added to the variable sum to generate a value $sum_n$ in step 710 ($sum_n=m_n+sum$). The encryption process then for example ends in step 711 (END) and the output encrypted data value $c_n$ is for example equal to the sequence composed by the 630 random numbers of 8 bytes and a last number of 8 bytes ($rand_0$, . . . , $rand_{629}$, $sum_n$).

To decrypt an encrypted data value c' generated by server 102, the process for example involves re-using, by the secure circuit 520, the 630 random numbers $rand_0$ to $rand_{629}$. The encrypted data value c' is for example a sequence including, as its 630 first values, the 630 random numbers $rand_0$ to $rand_{629}$, and as its last value, a value sum' resulting from the operations applied by server 102 to one or more values $sum_n$. In embodiments, the secure circuit 520 is configured to perform steps 701 to 709 until, in step 708, the iterative value i=9. Then, operation 710 is replaced by an operation in which the decrypted data value m' is obtained by subtracting the new variable sum from the last value sum' of the encrypted data c'.

Figure 8:
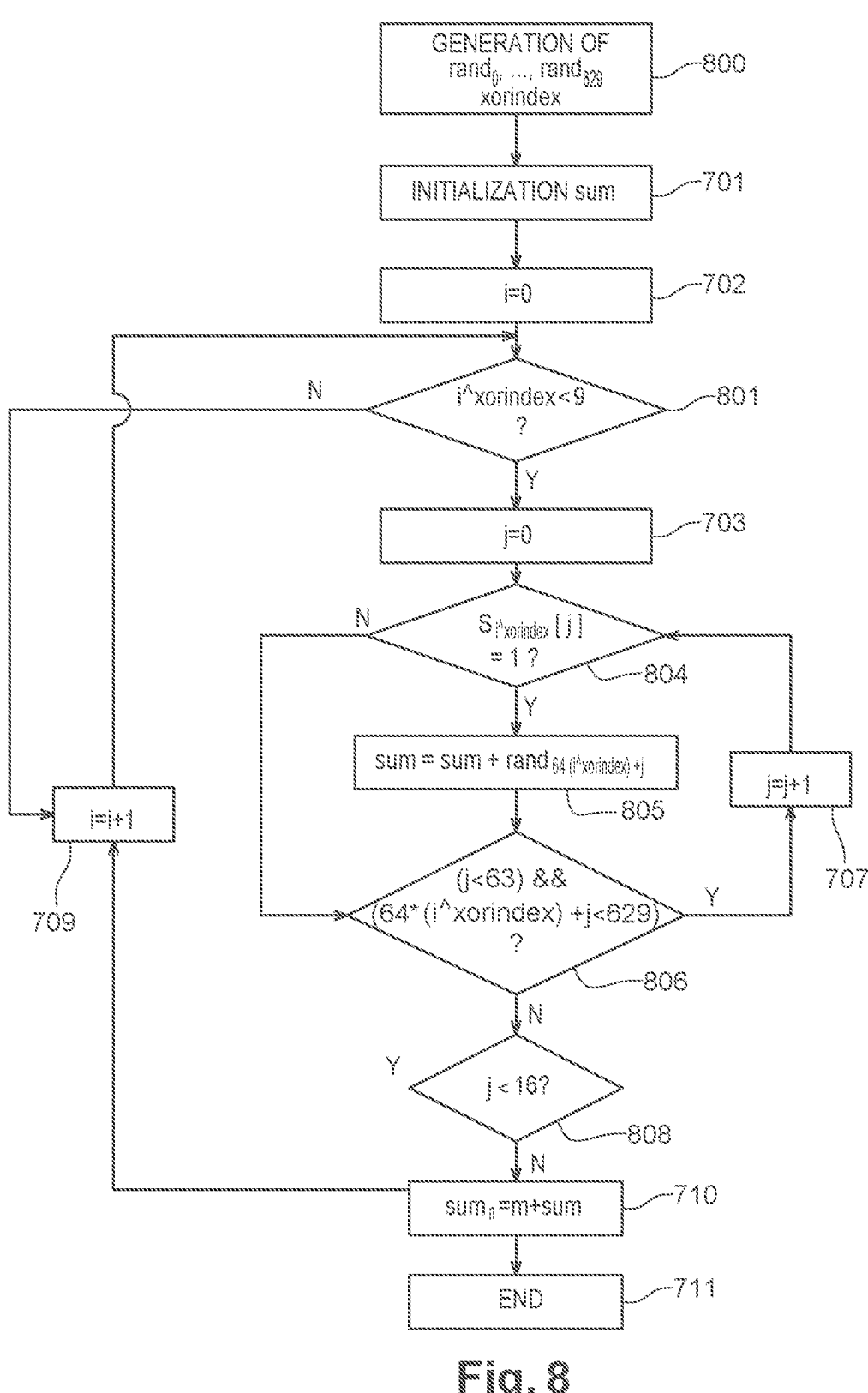
FIG. 8 is a flow diagram illustrating operations performed by the electronic device to encrypt or decrypt data according to another example embodiment of the present disclosure.

FIG. 8 is a flow diagram illustrating operations performed by the electronic device 100 to encrypt or decrypt data according to another example embodiment. In particular, FIG. 8 illustrates an alternative to the method of FIG. 7 in which a countermeasure is implemented against attacks against the electronic device 100 in which an attacker may attempt to obtain the value of the secret key. The countermeasure of FIG. 8 involves scrambling the order of the words S processed in the encryption process described in relation to FIG. 7. This countermeasure is for example performed to thwart side-channel attacks or attacks by power consumption analysis. Certain steps of FIG. 8 are the same as steps of FIG. 7 and have been labeled with like reference numerals.

In step 800 (GENERATION OF $rand_0$, . . . , $rand_{629}$, xorindex), 630 random numbers $rand_0$ to $rand_{629}$ are generated, as in a realization of step 700. Furthermore, in step 800, a random number xorindex is generated. For example, the random number xorindex is generated with the condition that it belongs to a set of integers of the form $\{0, \ldots, 2^b\}$, with b an integer. In the example illustrated by FIG. 8, b=4 but other values are possible for the integer b.

Following step 800, steps 701 and 702 consisting of the initialization of the variable sum and of the iterative variable i, described in relation to FIG. 7, are executed by the cryptographic processor 508.

Then, in step 801 (i^xorindex<9?) it is determined whether the result of the operation i XOR xorindex is less than to 9.

If so (branch Y), the iterative variable j is initialized to 0 in step 703.

In step 804 ($S_{i^{\wedge}xorindex}[j]$=1), similar to step 704 except for the index of the word being considered ($S_i$ is replaced by $S_{i^{\wedge}xorindex}$), it is determined whether the $j^{th}$ bit of the (i XOR xorindex)$^{th}$ word $S_{i^{\wedge}xorindex}$ is equal to 1. If it is the case (branch Y), the process continues in step 805 ($sum=sum+rand_{64*i^{\wedge}xorindex+j}$), wherein the variable sum is incremented with the $(64*(i$ XOR $xorindex)+j)^{th}$ random data $rand_{64*(i\ XOR\ xorindex)+j}$.

If, in step 804, it is determined that the $j^{th}$ bit of the (i XOR xorindex)$^{th}$ word $S_{i^{\wedge}xorindex}$ of the secret key is not equal to 1, or following step 805, the process continues with step 806 ((j<63)&&(64*(i XOR xorindex)+j<629)?).

Step 806 is similar to step 706, except that it is for example determined whether the iterative variable j is less than 63 and the value 64(i XOR xorindex)+j is less than to 629. If, in step 806, it is determined that the iterative variable j is less than 63 and that the value 64(i XOR xorindex)+j is less than to 629 (branch Y), the process continues with the step 707 and then returns to step 804. If, in step 806, it is determined that the iterative variable j is equal to 63 or that the value 64(i XOR xorindex)+j is greater than 629, (branch N), the process continues with step 808 (i<16?). Step 808 is similar to step 708, except that the threshold value for the iterative variable i is 16 and no longer 9. Indeed, if i=16, it means that all of the words of the secret key have been processed in the succession of steps 703, 804, 805, and 706.

If the iterative variable i is less than 16 (branch Y) or if, in step 801, it is determined that the value i XOR xorindex is equal to 9, the process continues with the step 709. Following step 709, wherein the iterative value i is incremented, the process returns to step 801.

If, in step 808, it is determined that the iterative variable i is equal to 16 (branch N), then the plaintext data $m_n$ is added to the variable sum in step 710 ($sum_n=m_n+sum$). The encryption process then for example ends in step 711 (END) and the output encrypted data value $c_n$ is for example equal to the sequence $(rand_0, \ldots, rand_{629}, xorindex, sum_n)$. The decryption of encrypted data is then similar to the one described in relation with FIG. 7.

Figure 9:
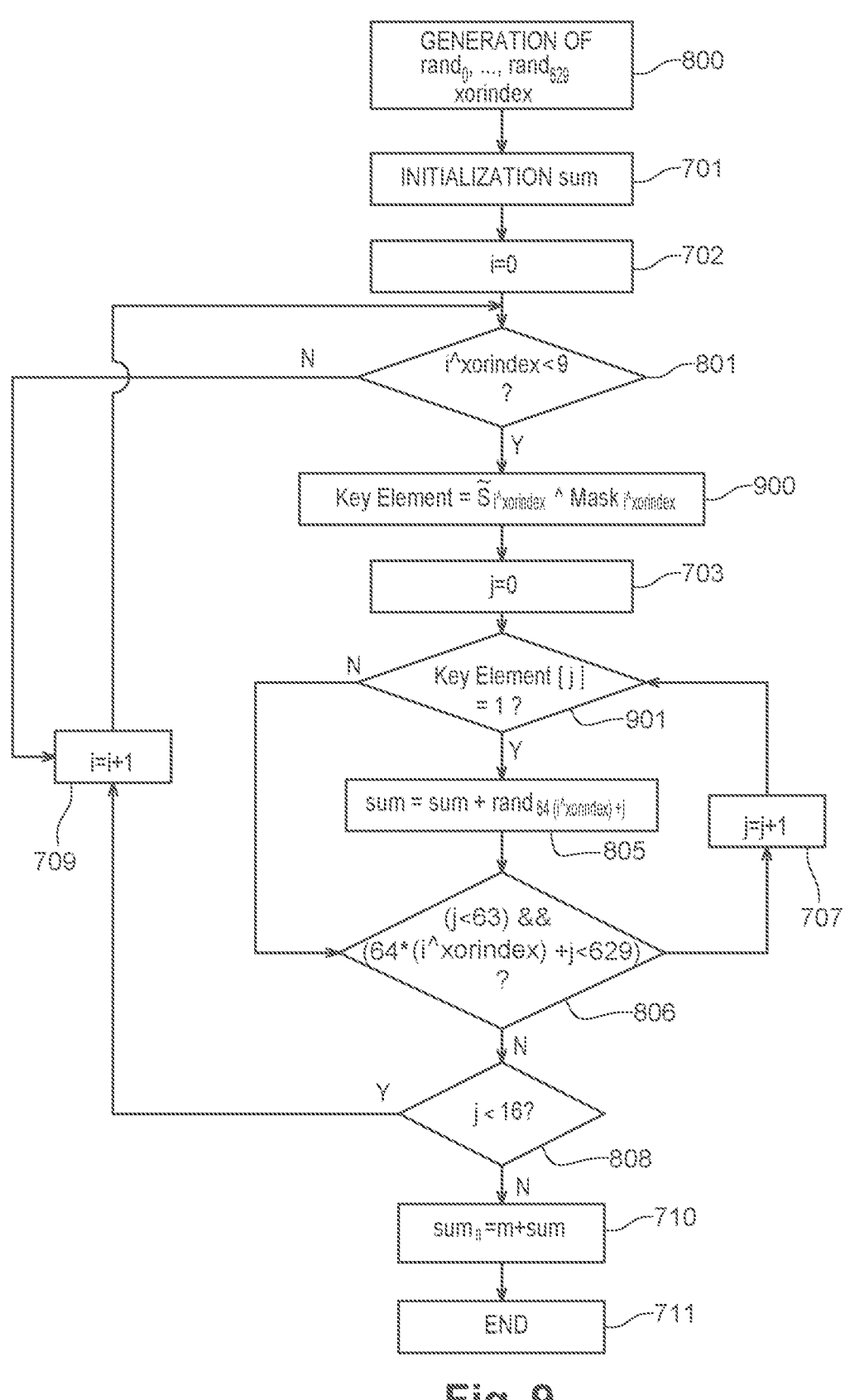
FIG. 9 is a flow diagram illustrating operations performed by the electronic device to encrypt or decrypt data according to another example embodiment of the present disclosure.

FIG. 9 is a flow diagram illustrating operations performed by the electronic device 100 to encrypt or decrypt data according to another example embodiment. In particular, FIG. 9 illustrates the implementation of a supplementary countermeasure, by masking the words S processed in the encryption process described in relation with FIG. 8. It would be equally possible to apply the masking technique of FIG. 8 to the method of FIG. 7, in other words to implement masking without scrambling the order.

According to an embodiment, the secret key K is stored masked in the secure element 520. For example, each word $S_i$ of the secret key K, with $i \in \{0, \ldots, 9\}$, is masked with a mask $Mask_i$. The secure circuit 520 for example stores 10 masked words $\widetilde{S_0}$ to $\widetilde{S_9}$. For example, the masks $Mask_1$ to $Mask_9$ are generated randomly by the random number generator 518.

Following to the realization of steps 800, 701, 702 and 801, which are the same as those of FIG. 8, and if the value i XOR xorindex is less than to 9 (branch Y of step 801), the masked word $\tilde{S}_{i^\wedge xorindex}$ of index i XOR xorindex is for example loaded in the volatile memory of the secure circuit 520, and is demasked in step 900 (KeyElement=$\tilde{S}_{i^\wedge xorindex}^\wedge Mask_{i^\wedge xorindex}$). In the step 900, the demasked word $S_{i^\wedge xorindex}$ is for example obtained by applying an XOR operation to the masked word $\tilde{S}_{i^\wedge xorindex}$ and the mask $Mask_{i^\wedge xorindex}$. The value of the demasked word $\tilde{S}_{i^\wedge xorindex}$ XOR $Mask_{i^\wedge xorindex}$ is then for example affected to a variable KeyElement.

Following step 900, the iterative variable j is for example initialized in step 703. Then, in step 901, it is for example determined whether the $j^{th}$ bit of the variable KeyElement is equal to 1.

Following the step 901, the process for example continues according to the sequence of steps 805, 806, 707, 808, 709, 710, and 711, as described in relation to FIG. 8.

The output encrypted data value is for example equal to the sequence $(rand_0, \ldots, rand_{629}, xorindex, sum_n)$ and the decryption of an encrypted data is then similar to the one described in relation with FIG. 7.

Figure 10:
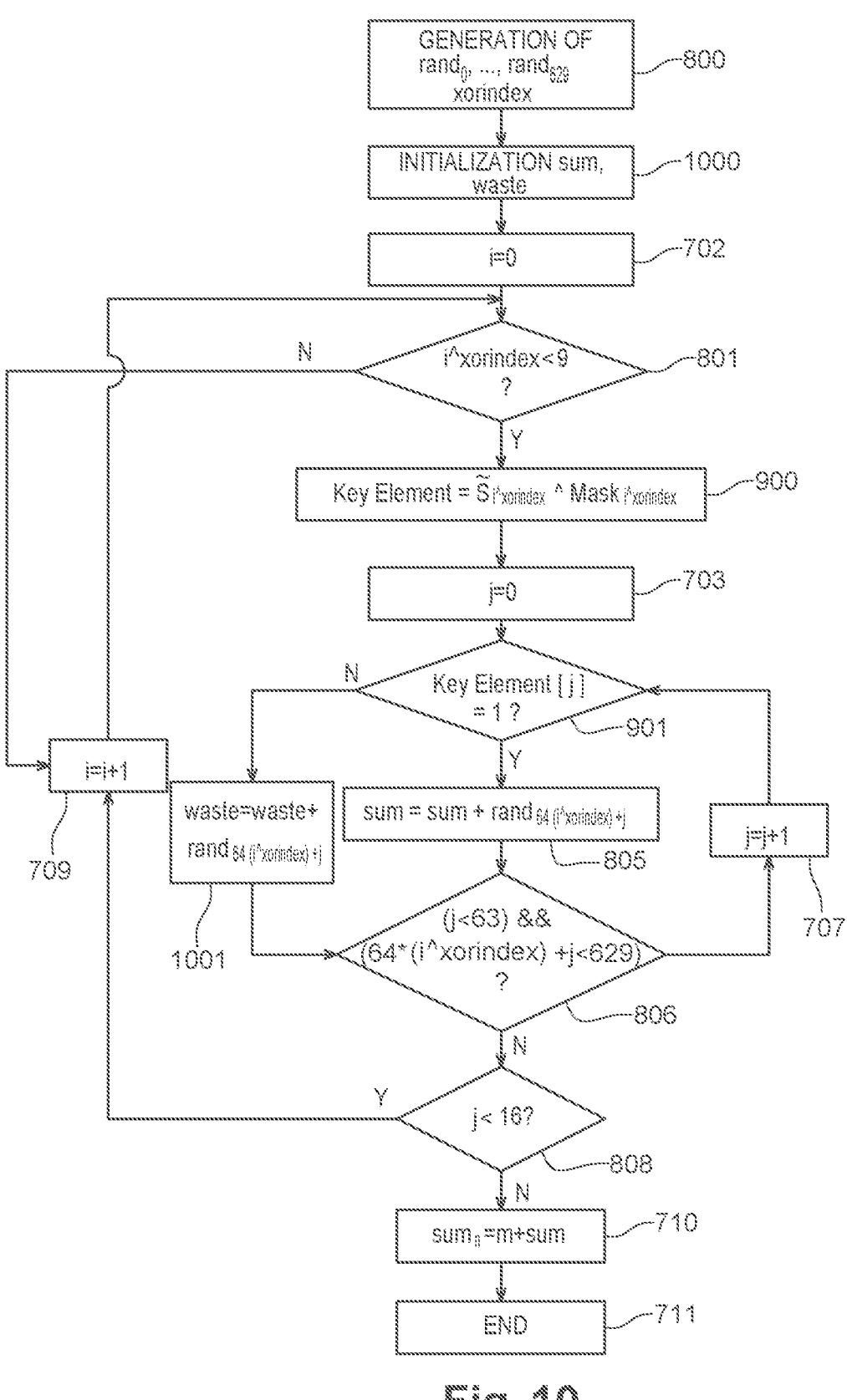
FIG. 10 is a flow diagram illustrating operations performed by the electronic device to encrypt or decrypt data according to yet another example embodiment of the present disclosure.

FIG. 10 is a flow diagram illustrating operations performed by the electronic device to encrypt or decrypt data according to yet another example embodiment. In particular, FIG. 10 illustrates the implementation of a supplementary countermeasure that is applied with respect to the method of FIG. 9. This countermeasure involves performing a dummy operation when the $j^{th}$ bit of the $i^{th}$ word of the secret key K is not equal to 1 (steps 704, 804 and 901 of FIG. 9). This countermeasure thwarts attacks by power consumption analysis. It would be equally possible to apply the dummy operation technique of FIG. 10 to the method of FIG. 7 or 8, in other words, to implement dummy operations without scrambling the order or masking the key.

After step 800, the method of FIG. 10 for example includes step 1000 (INITIALIZATION sum, waste) that replaces step 701 of FIG. 9. In step 1000, the variable sum is initialized, for example to the value 0 and a dummy variable waste is also initialized, for example to 0.

The process then continues as the process described in relation to FIG. 9, until the realization of step 901. Step 901 of FIG. 10 is the same as the one of FIG. 9, except that, if the $^jth$ bit is not equal to 1, step 1001 (waste=waste+ $rand_{64(i^\wedge xorindex)+j}$) is implemented before the step 706. In step 1001, the variable waste is incremented with the value of the $(64*(i$ XOR $xorindex)+j)^{th}$ random number $rand_{64(i^\wedge orindex)+j}$. Indeed, to make it indistinguishable whether the bit verified in step 901 is equal to 1 or not, similar additions are performed in both the steps 805 and 1001 following the output branches Y and N respectively of step 804. This way, if an attack by power consumption analysis occurs, it will be difficult to deduce the values of the bits considered in step 901 (or similarly in step 704 or 804 of FIG. 7 or 8).

According to an embodiment, to avoid template attacks, all operations are done bitwise at 32 bits or 64 bits, depending on the integrated circuit 500 architecture.

An advantage of the described embodiments is that the bootstrapping key $b_k$ is directly furnished to server 102 without being generated by the electronic device 100.

Another advantage of at least some of the described embodiments is that the secret key K is stored in a secured way, in the secure circuit 520.

Another advantage of at least some of the described embodiments is that the secret key is further protected by implementing countermeasures during its utilization during the fully homomorphic encryption and decryption of data values.

Various embodiments and variants have been described. Those skilled in the art will understand that certain features of these embodiments can be combined and other variants will readily occur to those skilled in the art. In particular, the countermeasures described in relation with FIGS. 7 to 10 can be dissociated. Moreover, the secret key K is presented as being a sequence of 10 words of 64 bits each, but other representations are possible. In particular, the number of words and the number of bits can vary.

Finally, the practical implementation of the embodiments and variants described herein is within the capabilities of those skilled in the art based on the functional description provided hereinabove. For example, the implementation of the secure circuit 520 will be within the capabilities of those skilled in the art.

What is claimed is:

1. A method, comprising:
generating, by a computing device, a first key and a bootstrapping key;
communicating, by the computing device, the first key and an identifier of the bootstrapping key to an electronic device;
communicating, by the computing device, the bootstrapping key and the identifier to a server;
performing, by the electronic device, a fully homomorphic encryption of a first data value stored in the electronic device using the first key to generate an encrypted first data value; and
communicating, by the electronic device, the encrypted first data value and the identifier to the server.

2. The method of claim 1, further comprising:
receiving, by the electronic device, a second data value from the server; and
performing, by the electronic device, a fully homomorphic decryption of the second data value using the first key to generate a third data value, the third data value corresponding to a result of a first operation applied to the first data value.

3. The method of claim 2, further comprising performing, by the server, the first operation on the second data value in accordance with a fully homomorphic processing algorithm based on the encrypted first data value and the bootstrapping key.

4. The method of claim 3, wherein the fully homomorphic processing algorithm is performed by a neural network implemented within the server.

5. The method of claim 4, wherein one or more neurons of the neural network are configured to perform a bootstrapping operation using the bootstrapping key.

6. The method of claim 3, wherein the first key is a sequence of N words of bits, each of the N words having a number of M bits, and wherein applying the fully homomorphic processing algorithm comprises:

generating a total of J+1 random numbers, where J+1 equals the product of N and M;

calculating the sum of the product of bits of the first key with corresponding ones of the generated random numbers; and adding a data value to be encrypted to the sum.

7. The method of claim 6, wherein the order of the additions in the calculating the sum of the product of bits is randomly selected by a cryptographic processor of the server.

8. The method of claim 7, where the calculating further comprises calculating a sum of the random numbers for which the corresponding bit of the first key is zero.

9. The method of claim 2, wherein the electronic device includes a cryptographic processor, wherein the fully homomorphic encryption of the first data value comprises:

generating, by the cryptographic processor, an intermediary first data value by encoding the first data value; and applying, by the cryptographic processor, a fully homomorphic encryption algorithm to the intermediary first data value using the first key to generate the encrypted first data value.

10. The method of claim 9, wherein the fully homomorphic decryption of the second data value comprises:

applying, by the cryptographic processor, a fully homomorphic decryption algorithm to the second data value using the first key to generate an intermediary third data value; and decoding, by the cryptographic processor, the intermediary third data value to generate a third data value.

11. The method of claim 1, wherein the electronic device includes a secure circuit, and wherein the method further comprises storing, by the electronic device, the first key in the secure circuit after receiving the first key.

12. The method of claim 1, wherein the first key is stored in a memory of the electronic device masked with a random mask, wherein the first key is demasked during performing of the fully homomorphic encryption.

13. A system, comprising:

a computing device configured to:

generate a first key and a bootstrapping key, and communicating the bootstrapping key and an identifier of the bootstrapping key to a server; and an electronic device comprising a cryptographic processor and a memory coupled to the cryptographic processor and storing a program, the program comprising instructions that when executed by the cryptographic processor enable the electronic device to:

receive the first key and the identifier from the computing device, perform a fully homomorphic encryption of a first data value stored in the electronic device using the first key to generate an encrypted first data value, and communicate the encrypted first data value and the identifier to the server.

14. The system of claim 13, further comprising the server, the server configured to:

compute a second data value in accordance with a fully homomorphic processing algorithm based on the encrypted first data value; and communicate the second data value to the electronic device, wherein the electronic device is configured to perform a fully homomorphic decryption of the second data value using the first key to generate a third data value, the third data value corresponding to a result of a first operation applied to the first data value.

15. The system of claim 14, wherein the first key is a sequence of N words of bits, each of the N words having a number of M bits, and wherein applying the fully homomorphic processing algorithm comprises:

generating a total of J+1 random numbers, where J+1 equals the product of N and M;

calculating the sum of the product of bits of the first key with corresponding ones of the generated random numbers; and adding a data value to be encrypted to the sum.

16. The system of claim 15, wherein the order of the additions in the calculating the sum of the product of bits is randomly selected by a cryptographic processor of the server.

17. The system of claim 13, wherein the electronic device comprises a secure circuit, and wherein the secure circuit is configured to store the first key after receiving the first key.

18. The system of claim 13, wherein the electronic device includes a cryptographic processor configured to:

generate an intermediary first data value by encoding the first data value; and apply a fully homomorphic encryption algorithm to the intermediary first data value using the first key to generate the encrypted first data value.

19. An electronic device, comprising:

a cryptographic processor; and a memory storing a program and coupled to the cryptographic processor, the program comprising instructions that when executed by the cryptographic processor enable the electronic device to:

receive a first key from a computing device;

generate an intermediary first data value by encoding a first data value; apply a fully homomorphic encryption algorithm to the intermediary first data value using the first key to generate an encrypted first data value; and communicate the encrypted first data value and an identifier of a bootstrapping key generated by the computing device to a server.

20. The electronic device of claim 19, wherein the electronic device is further configured to receive a second data value from the server, wherein the second data value is computed by the server in accordance with a fully homomorphic processing algorithm based on the encrypted first data value, and wherein the electronic device is further configured to perform a fully homomorphic decryption of the second data value using the first key to generate a third data value, the third data value corresponding to a result of a first operation applied to the first data value by the server.

* * * * *